United States Patent Office 3,100,252
Patented Aug. 6, 1963

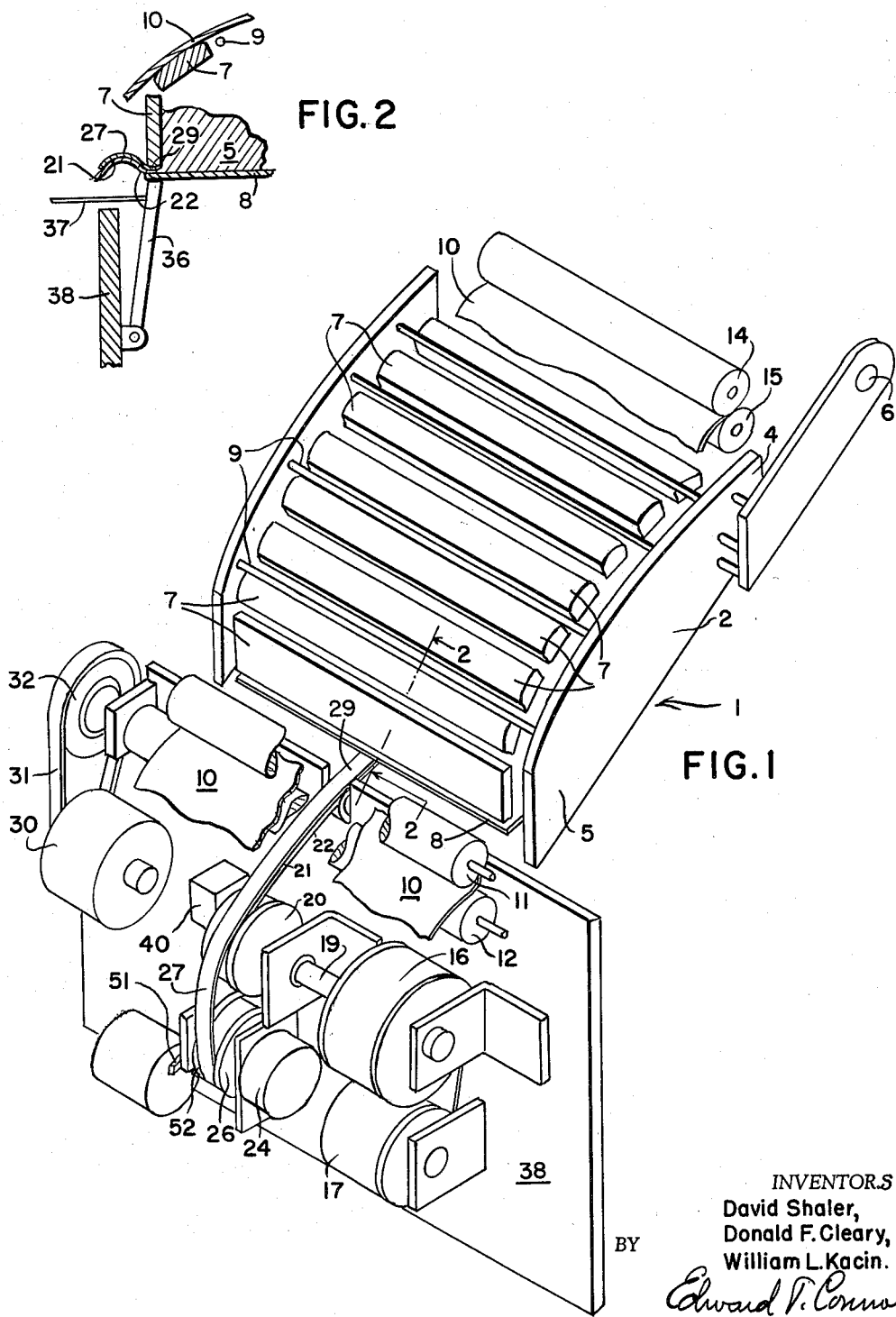

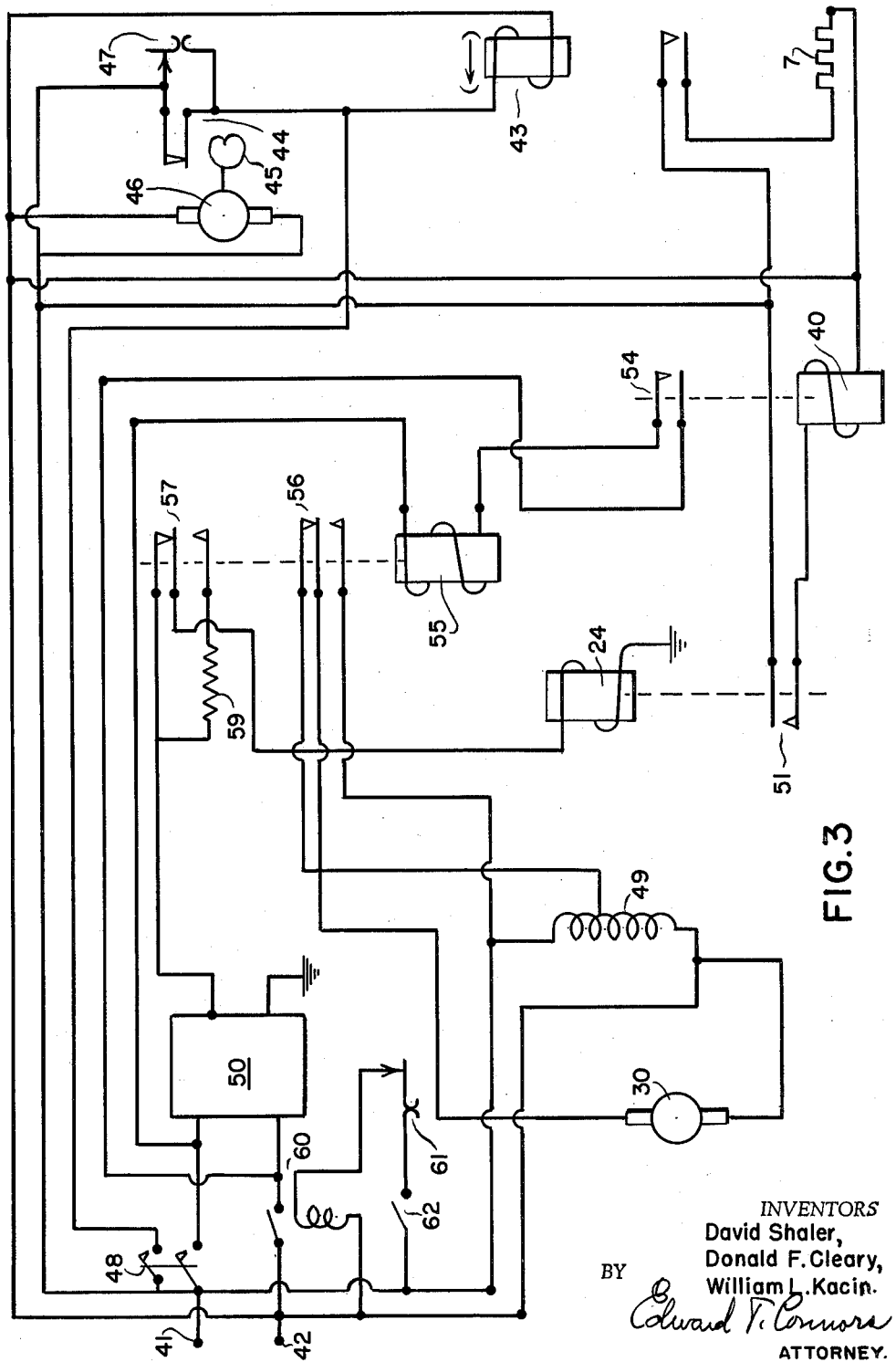

3,100,252
RECORDER DRYING MECHANISM
David Shaler, Waldwick, N.J., and Donald F. Cleary, West Islip, and William L. Kacin, Beth Page, N.Y., assignors to Hogan Faximile Corporation, New York, N.Y.
Filed Dec. 16, 1960, Ser. No. 76,301
5 Claims. (Cl. 219—19)

The present invention relates to electrolytic facsimile recorders and more particularly to an improved mechanism for drying the recorded electrolytic medium.

Electrolytic recording is the art of producing copy by means of the electrolytic action of an electric current upon a properly sensitized medium such as a paper sheet or strip. The original copy is scanned line-by-line in any well known manner to cause variations to be set up in a photoelectric cell responsive to variations in the density across the line. The output of the photo-electric cell is amplified and utilized, usually at a remote point, to form marks on electrolytic paper with corresponding density variations. In the recorder the mark has been made by passing the recording paper between a rotating helical electrode and a fixed linear electrode. In such a recorder a line is recorded for each revolution of the helical electrode. Thus with a recording resolution of one hundredth of an inch per scan, the speed of recording has been limited to a maximum practical speed of about nine tenths of an inch per minute.

The recording paper may be of the type disclosed in U.S. Patent No. 2,358,839 to Wagner in which the paper is impregnated with a polyhydroxy phenolic compound and an electrolyte. The normally colorless impregnant has the characteristic of forming a colored mark with iron which is supplied by the anode under the action of the marking current passing through the electrolyte while the paper is in a moistened condition.

The process of marking is electrolytic in action and the density of the marks are increased by heating the recorded paper. After the paper has been marked it is necessary to remove the moisture. In U.S. Patent No. 2,485,678 issued to Tribble, there is shown a facsimile recorder of the type described above and incorporating electric heating means for intensifying the mark and drying the recorded paper.

The art of electronic recording has progressed so that present recording rates of six hundred inches per minute are possible, or over six hundred times the practical recording rate of the helical type recorder. Such high rates of recording are possible by the use of a multi styli recorder as made by the Hogan Faximile Corporation, New York, N.Y. In the multi styli recorder about one hundred or more styli per inch are positioned in a line across the recording paper over a linear electrode. Inasmuch as each stylus can record at the same rate, or even faster, than the rate of the single recording spot of the helical electrode recorder, very high recording speeds are possible.

Because of the high recording speed of the multi-styli recorder, it has been found that the use of electric heating means as shown in Patent No. 2,485,678 is not wholly satisfactory. Inasmuch as the rate of drying of the recording medium depends upon the rate of application of heat, it is obvious that the heating power for the multi styli recorder must be increased at least six hundred times. With such a large amount of power and because of the inherent heat storage capacity of the heating bars, it is impossible in a satisfactory manner to practically control the drying power by the use of a thermostat. In using the multi styli recorder, it has been found that upon the stopping of the recording, the stored heat in the heater bars is sufficient to char the recording medium. From a practical standpoint the use of thermostats is unsatisfactory because of the wide temperature differential between the opening and closing of the thermostat contacts.

The present invention aims to overcome the difficulties and disadvantages of prior art devices by providing drying means which is removed from contact with the recording medium or paper as soon as movement thereof past the drying means has ceased.

Additionally means are provided to maintain the heater units at the desired constant temperature including cyclically operating relay means to provide an average power input into the heater units so that a predetermined constant temperature thereof is maintained under both operating and standby conditions.

Another object of the invention is to provide drying means for moist electrolytic recording paper in which the amount of heat is automatically controlled.

Other objects and advantages of the invention will be apparent from the following description and from the accompanying drawings which show by way of example, an embodiment of the invention.

In the drawing:
FIGURE 1 is a fragmentary perspective view of a drying mechanism in accordance with the invention.
FIGURE 2 is a fragmentary view taken along the line 2—2 of FIGURE 1.
FIGURE 3 is a schematic electrical wiring diagram of the drying mechanism, the switches being shown in standby position.

Referring to the drawings there is shown in FIGURE 1 a dryer 1 including a frame 2 having two ends 4 and 5. The end 4 is pivotally supported by mounting means 6. The frame 2 carries one or more electric heater units 7. A cross-bar 8 extends across the ends 5 of the frame 2. Framework not shown carries supporting means or rods 9 to hold an electrolytic recording medium 10 in position over the heater units 7. Roller means 11 and 12 are electrically powered for moving the recording medium 10 past the heater unit 7, auxiliary rollers 14 and 15 being provided to maintain the paper in proper alignment with the heating units or bars 7 as it passes thereover.

In order to support a portion of the weight of the frame 2 with the heating units 7 there is provided a negator spring 16. This spring as is known in the art is so fabricated as to tend to rewind itself after it has been unrolled on a coil 17. However, the winding force of the negator spring 16 is so selected that it does not wholly support the frame 2, about one pound of the frame weight being unsupported.

The negator spring 16 is operative through a shaft 19 having at its end a pulley wheel 20 around which is wrapped a strap 21 having one end 22 attached to cross-bar 8 of the frame 2, the other end of the strap being attached to the pulley 20. In order to supply the additional energy to lift the frame 2 into position so that the heater units 7 contact the electrolytic recording medium 10, there is provided a lift solenoid 24 operative through suitable gearing to drive a pulley 26 which also has a strap 27 wrapped therearound, one end of the strap 27 being attached to the pulley 26 while its other end 29 is attached to the cross-bar 8 of the frame 2. Strap 27 lies over strap 21.

The rollers 11 and 12 are rotated by a torque motor 30 adapted to drive a belt 31 passing over a pulley 32 on the end of one of the rollers 11 or 12. In order that the rollers 11 and 12 may rotate in synchronism, suitable gearing may be provided in any conventional manner not shown.

In order that the frame 2 may be held in its upward position during operation of the recorder mechanism there is provided a blocking bar 36 having an actuating rod 37 for moving the blocking bar 36 inwardly from under the cross-bar 8 of the frame 2, the contact being made through roller 36a. A panel 38 may be used for mounting the various parts including the spring 16, the coil 17, and the blocking bar 36. The actuating rod 37 is moved inwardly by means of a hold solenoid 40. The parts are so arranged that upon the failure of electric current in the hold solenoid its armature drops allowing the actuating rod 37 and the blocking bar 36 to move outwardly so that the frame 2 drops of its unsupported weight thereby withdrawing the heater units 7 from contact with the electrolytic recording medium 10.

In the operation of the electric circuit the source 41—42 is energized with a portion of the recorder circuit not shown. Upon the energization of the source the heater bars 7 are energized through a relay 43 by a timing switch 44 actuated by a cam 45 driven by a motor 46. Across the switch contacts 44 is a thermostat 47 which is used to quickly bring the heater bars up to operating temperature. After operating temperature has been achieved the thermostat 47 opens and cycled energization of the heater takes place through operating of the cam 45 by the motor 46 as will be explained more fully later herein. Meanwhile the roller motor 30 is operated at a reduced voltage through an auto transformer 49.

Upon a recording operation switch 48 is closed thereby energizing convertor power supply 50 providing direct current for the lift solenoid 24. Simultaneously upon the closing of operating switch 48, the switch 44 is shorted out thereby providing continuous energization of the heater bars 7. Upon the actuation of the lift solenoid 24 the frame 2 is moved upwardly so that the heater bars 7 contact the electrical recording medium 10. As the frame 2 approaches its upward position a lift solenoid switch 51 is actuated into the closed position by a projection 52 on the pulley 26, the switch 51 energizing the hold solenoid 40, which, in turn urges the actuating rod 37 inwardly so that the blocking bar 36 is in position under the cross-bar 8 of the frame 2. The hold solenoid 40 is adapted to close a switch 54 energizing a relay 55 having two sets of double throw contacts 56 and 57.

In standby position when switch 48 is open, double throw contacts 56 are completing a circuit so that reduced voltage is applied to the torque roller motor 30. Double throw contacts 57 are in a position ready to energize lift solenoid 24 as soon as switch 48 is closed.

In operate position when switch 48 is closed, the double throw contacts 56 and 57, for the moment, remain in the standby position until the operation of the solenoid 24 has resulted in the closing of switch 51 energizing the hold solenoid 40. Upon actuation of the hold solenoid 40 switch 54 is closed, and at this time relay 55 is energized actuating double throw contacts 56 and 57 into operate position.

Upon the actuation of double throw contacts 56 full line voltage is applied to the torque roller motor 30 thereby causing movement of the recording medium 10. Double throw contact 57 switches the direct current supply voltage to the lift solenoid 24 through a resistor or other voltage reducing means 59.

It should be noted that the voltage across the lift solenoid 24 may be reduced to reduce heating thereof during operation as the weight of the frame 2 is carried by the blocking bar 26. Sufficient voltage is maintained on the lift solenoid 24 to maintain tension on the strap 27 so that when operation is ceased the frame 2 will drop smoothly as there will be no possible loop in the strap 27.

Also it should be noted that in the standby condition, the torque roller motor 30 has sufficient voltage so that enough torque is applied to the recording medium 10 so that it does not drop between the supports 9 into contact with the heater bars 7 and so that there is a smooth even starting movement of the recording medium 10.

An important feature of the construction is the use of the cycled energization of the heater units 7. As stated above it has been found impractical to use a thermostat to control the temperature of the heater units 7 during standby operation. It is obvious that an excess of stored heat in the heater units 7 may result in charring of the recording medium upon first contact therewith, and that if the stored heat is insufficient improper drying will result. Further, because the density of the recorded mark is, in many cases, greatly improved by the proper application of heat, it is very important that the heat be closely controlled.

The cam 45 is preferably of the adjustable type in which two plates may be rotatably moved into a desired position with respect to each other and thereafter locked into position. Inasmuch as the normal temperature under which the drying mechanism is operated does not vary to a large extent the setting of the cam 45 need not be further adjusted after its initial adjustment.

In order to protect against paper ripping, absence of paper, low paper supply, and various other contingencies which might occur a normally closed relay 60, controlled by a thermostat 61, or other protective means such as a sensing switch 62, is provided to automatically trip the circuit from operating to standby condition.

It is thus apparent that the present invention provides an improved mechanism for drying recorded electrolytic medium such as marked in high speed recorders.

While the invention has been described and illustrated with reference to a specific embodiment thereof, it will be understood that other embodiments may be resorted to without departing from the invention. Therefore, the form of the invention set out above should be considered as illustrative and not as limiting the scope of the following claims.

We claim:

1. A drying mechanism for a facsimile recorder using an electrolytic recording medium, the drying mechanism comprising a frame, pivotable mounting means for the frame, counterbalancing means for the weight of the frame including a negator spring, heater means carried by the frame, means to swing the frame about its mounting, and means to urge the heater means into contact and away from contact with the recording medium.

2. A drying mechanism for a facsimile recorder using an electrolytic recording medium, the drying means comprising a frame having two ends, pivotable mounting means for the frame positioned at one end thereof, at least one heater unit carried by the frame, the heater unit adapted to be retractably moved into contact with the recording medium, roller means for moving the recording medium past the heater unit, negator counterspring means operatively connected to the other end of the frame and supporting the greater portion of the weight thereof, lifting means operatively connected to said other end of the frame for lifting the heater unit into contact with the recording medium, holding means releasably maintaining the heater unit in contact with the recording medium, and interlocking means whereby upon the deenergization of the roller means for moving the recording medium past the heating unit the holding means is deenergized so that the frame carrying the heater unit is dropped away from the recording medium.

3. A drying mechanism for a facsimile recorder using an electrolytic recording medium, the drying means comprising a frame having two ends, pivotable mounting means for the frame positioned at one end thereof, at least one electric heater unit carried by the frame, the heater unit adapted to be retractably moved into contact with the recording medium, electric powered roller means for moving the recording medium past the heater unit, negator counterspring means operatively connected to the other end of the frame and supporting the greater portion of the weight thereof, electric powered lifting means operatively connected to said other end of the frame for lifting the heater unit into contact with the recording medium, electric powered holding means releasably maintaining the heater unit in contact with the recording medium, and electrical interlocking means whereby upon the deenergization of the electric powered roller means for moving the recording medium past the heating unit the electric powered holding means is deenergized so that the frame carrying the heater unit is dropped away from the recording medium.

4. A drying mechanism for a facsimile recorder using an electrolytic recording medium, the drying means comprising a frame having two ends, pivotable mounting means for the frame positioned at one end thereof, at least one heater unit carried by the frame, supporting means to position the recording medium over the heater unit, the heater unit adapted to be retractably moved into contact with the recording medium between said supporting means, roller means for moving the recording medium past the heater unit, negator counterspring means operatively connected to the other end of the frame and supporting the greater portion of the weight thereof, lifting means operatively connected to said other end of the frame for lifting the heater unit into contact with the recording medium, holding means releasably maintaining the heater unit in contact with the recording medium, and interlocking means whereby upon the deenergization of the roller means for moving the recording medium past the heating unit the holding means is deenergized so that the frame carrying the heater unit is dropped away from the recording medium.

5. A drying mechanism for a facsimile recorder using an electrolytic recording medium, the drying means comprising a frame having two ends, pivotable mounting means for the frame positioned at one end thereof, at least one electric heater unit carried by the frame, supporting means to position the recording medium over the heater unit, the heater unit adapted to be retractably moved into contact with the recording medium between said supporting means, electric powered roller means for moving the recording medium past the heater unit, negator counterspring means operatively connected to the other end of the frame and supporting the greater portion of the weight thereof, electric powered lifting means operatively connected to said other end of the frame for lifting the heater unit into contact with the recording medium, electric powered holding means releasably maintaining the heater unit in contact with the recording medium, and electrical interlocking means whereby upon the deenergization of the electric powered roller means for moving the recording medium past the heating unit the electric powered holding means is deenergized so that the frame carrying the heater unit is dropped away from the recording medium.

References Cited in the file of this patent
UNITED STATES PATENTS 1,960,697    Cochran et al. _____ May 29, 1934
2,639,364    Doyle _____ May 19, 1953